United States Patent
Youn et al.

(10) Patent No.: US 11,305,617 B2
(45) Date of Patent: Apr. 19, 2022

(54) VENT UNIT FOR VEHICLE

(71) Applicants: Hyundai Motor Company, Seoul (KR); KIA Motors Corporation, Seoul (KR); NIFCO KOREA INC., Asan-si (KR)

(72) Inventors: Hae Dong Youn, Incheon (KR); Yong Chul Kim, Hwaseong-si (KR); Won Sang Cho, Asan-si (KR)

(73) Assignees: Hyundai Motor Company, Seoul (KR); KIA Motors Corporation, Seoul (KR); NIFCO KOREA INC., Asan-si (KR)

( * ) Notice: Subject to any disclaimer, the term of this patent is extended or adjusted under 35 U.S.C. 154(b) by 16 days.

(21) Appl. No.: 16/414,017

(22) Filed: May 16, 2019

(65) Prior Publication Data

US 2020/0156446 A1     May 21, 2020

(30) Foreign Application Priority Data

Nov. 20, 2018  (KR) .......................... 10-2018-0143118

(51) Int. Cl.
 *B60H 1/34*    (2006.01)
(52) U.S. Cl.
 CPC ........... *B60H 1/3428* (2013.01); *B60H 1/345* (2013.01); *B60H 1/3435* (2013.01); *B60H 1/3421* (2013.01); *B60H 2001/3471* (2013.01)
(58) Field of Classification Search
 CPC ...... B60H 1/3435; B60H 1/345; B60H 1/247; B60H 1/3421; B60H 2001/3464;

(Continued)

(56) References Cited

U.S. PATENT DOCUMENTS 3,988,973 A  *  11/1976  Honmann ................. E04B 9/02
                                                              454/286
6,148,979 A  *  11/2000  Roach ..................... F16D 41/18
                                                              192/45.1

(Continued)

FOREIGN PATENT DOCUMENTS

DE  102004013171 B3  *  6/2005  ............. B60H 1/345
DE  102008050180 A1  *  4/2010  ............... B60H 1/34

(Continued)

OTHER PUBLICATIONS

Yamamoto et al,Translation of JP 2015031494 A (Year: 2015).*

(Continued)

*Primary Examiner* — Steven B McAllister
*Assistant Examiner* — Mark P Yost
(74) *Attorney, Agent, or Firm* — Lempia Summerfield Katz LLC

(57) ABSTRACT

A vent unit includes a bezel installed on a vehicle and formed in a ring shape with a flow hole at the center, and a spacer overlapping and coupled to the bezel and formed in a ring shape rotating relative to the bezel. The bezel has a plurality of first through-holes circumferentially spaced apart from one another, and the spacer has a plurality of second through-holes circumferentially spaced apart from one another such that conditioning air is discharged to an interior through the second through-holes and the first through-holes when the second through-holes are aligned with the first through-holes by circumferential rotation. The vent unit further includes a wing disposed in the flow hole of the bezel and coupled to the spacer through a hinge shaft. The wing controls discharge of conditioning air through the flow hole by axially rotating, and circumferentially relatively rotating together with the spacer.

9 Claims, 9 Drawing Sheets

(58) Field of Classification Search
CPC ........ B60H 2001/00721; B60H 1/3414; B60H 2001/3471; B23F 21/06; G05G 5/08; G05G 5/12; G05G 5/18; F16D 41/12; F16D 41/125; B25B 13/462; B25B 13/465
USPC .......................................... 74/575; 454/154
See application file for complete search history.

(56) References Cited

U.S. PATENT DOCUMENTS

| | | | | |
|---|---|---|---|---|
| 6,176,775 | B1 * | 1/2001 | Volk | B60H 1/3414 |
| | | | | 454/154 |
| 6,607,434 | B1 * | 8/2003 | Park | B60H 1/3421 |
| | | | | 454/155 |
| 6,616,523 | B1 * | 9/2003 | Tani | B60H 1/247 |
| | | | | 454/137 |
| 7,448,481 | B2 * | 11/2008 | Kimes | F16D 41/12 |
| | | | | 192/103 B |
| 8,057,288 | B2 * | 11/2011 | Konet | B60H 1/00742 |
| | | | | 454/155 |
| 10,343,493 | B2 * | 7/2019 | Terasawa | B60H 1/345 |
| 10,682,899 | B2 * | 6/2020 | Uhlenbusch | E04B 9/02 |
| | | | | 454/286 |
| 10,688,631 | B2 * | 6/2020 | Blumenthal | B25B 23/0007 |
| 10,792,979 | B2 * | 10/2020 | Gruenbeck | B60H 1/247 |
| | | | | 454/137 |
| 2012/0122387 | A1 * | 5/2012 | Nicola | B60H 1/3428 |
| | | | | 454/155 |
| 2014/0011436 | A1 * | 1/2014 | Kaneda | B60H 1/34 |
| | | | | 454/152 |
| 2017/0036508 | A1 * | 2/2017 | Terasawa | B60H 1/345 |

FOREIGN PATENT DOCUMENTS

| | | | | |
|---|---|---|---|---|
| DE | 102008050180 B4 | * | 6/2013 | ............... B60H 1/34 |
| JP | 2014213834 A | * | 11/2014 | ............... B60H 1/34 |
| JP | 2014213834 A | | 11/2014 | |
| JP | 2015031494 A | * | 2/2015 | ............ F24F 13/065 |
| JP | 2015031494 A | * | 2/2015 | ............... B60H 1/34 |
| JP | 6097137 B2 | | 3/2017 | |
| KR | 10-1998-041661 | | 8/1998 | |
| KR | 100802837 B1 | | 2/2008 | |
| KR | 100820453 B1 | | 4/2008 | |

OTHER PUBLICATIONS

Thang, Nguyen Duc, "Ratchet mechanism 5", Jun. 17, 2012, https://www.youtube.com/watch?v=bAL_nWjuhOI (Year: 2012).*
Bollaender (DE 102008050180 B4) Machine Translation Copy (Year: 2013).*
Hiroyuki Machine Translation Copy (Year: 2014).*
Yamamoto Machine Translation Copy (Year: 2015).*
Machine Translation of Uhlenbusch et al. (Year: 2005).*
Machine Translation of Hiroyuki et al. (Year: 2014).*
Machine Translation of Uhlenbusch (Year: 2005).*
Machine Translation of Bollaenderetal (Year: 2010).*
Nguyen Duc Thang, "Ratchet mechanism 5," Jun. 17, 2012, https://www.youtube.com/watch?v=bAL_nWjuhOI (Year: 2012).*
Machine Translation of Hiroyuki (Year: 2014).*

* cited by examiner

VENT UNIT FOR VEHICLE

CROSS REFERENCE TO RELATED APPLICATION

The present application claims priority to and the benefit of Korean Patent Application No. 10-2018-0143118, filed on Nov. 20, 2018, which is incorporated herein by reference in its entirety.

FIELD

The present disclosure relates to a vent unit being able to control flow of conditioning air discharged to interior of a vehicle.

BACKGROUND

The statements in this section merely provide background information related to the present disclosure and may not constitute prior art.

In the related art, most vent units of an automotive air-conditioning system control discharge of conditioning air by opening flow holes by axially rotating wings about hinge shafts. These bent units are installed in vehicles and passengers could control the direction of conditioning air by rotating and controlling wings. However, we have discovered that the conditioning air discharged through the wings is intensively blown, so specific or local areas of passengers' bodies are excessively heated or cooled, thereby deteriorating pleasantness for the passengers.

Accordingly, we have discovered a need for a new vent unit that increases the discharge areas of the conditioning air and improves pleasantness for the passengers.

The above information disclosed in this Background section is only for enhancement of understanding of the background of the present disclosure, and therefore it may contain information that does not form the prior art this is already known to a person of ordinary skill in the art.

SUMMARY

The present disclosure provides a vent unit for a vehicle. The vent unit is able to control flow of conditioning air that is discharged to the interior from an automotive air-conditioning system and is able to improve pleasantness for passengers by intensively or dispersedly blowing the discharged conditioning air.

According to an exemplary form of the present disclosure, a vent unit for a vehicle may include a bezel installed on the vehicle, formed in a ring shape with a flow hole at the center, and having a plurality of first through-holes circumferentially spaced apart from one another, a spacer overlapping and coupled to the bezel, formed in a ring shape rotating relative to the bezel, and having a plurality of second through-holes circumferentially spaced apart from one another such that conditioning air is discharged to an interior through the second through-holes and the first through-holes when the second through-holes are aligned with the first through-holes by circumferential rotation relative to the bezel, and a wing disposed in the flow hole of the bezel, coupled to the spacer through a hinge shaft, controlling discharge of conditioning air through the flow hole by axially rotating about the hinge shaft, and circumferentially relatively rotating together with the spacer with respect to the bezel.

According to a further form of the present disclosure, the spacer may be composed of an inner spacer and an outer spacer surrounding the inner spacer, the wing may be coupled to the inner spacer through the hinge shaft, the second through-holes circumferentially spaced apart from one another may be formed at the outer spacer, and a locking structure may be formed on each of the sides facing each other of the inner spacer and the outer spacer, so when the inner spacer and the wing are rotated in a first direction, the outer spacer may not be rotated, and when the inner spacer and the wing are rotated in a second direction, the outer spacer may be rotated together.

According to a further form of the present disclosure, protrusions may be formed on an inner side of the outer spacer, a rotation control tab that is locked to the protrusions may be formed on an outer side of the inner spacer, and when the rotation control tab comes in contact with the protrusions by rotation of the inner spacer and the wing in the first direction, the rotation control tab may slide over the protrusions without interference with the protrusions, and when the rotation control tab comes in contact with the protrusions by rotation of the inner spacer and the wing in the second direction, the rotation control tab may be locked to the protrusions such that the inner spacer and the outer spacer are rotated together.

According to a further form of the present disclosure, the rotation control tab and the protrusions may have slopes that face each other when the inner spacer and the wing are rotated in the first direction, so that the rotation control tab may slide over the slopes of the protrusions.

According to a further form of the present disclosure, a slit may be formed on an edge of rotation control tab, so that when the rotation control tab slides over the slopes of the protrusions, the rotation control tab may move back with elasticity.

According to a further form of the present disclosure, the protrusions may be formed in a shape of gear teeth on the inner side of the outer spacer.

According to a further form of the present disclosure, the first through-holes of the bezel may be inclined outward in the bezel in a discharge direction of air, so that conditioning air that is discharged through the first through-holes may be distributed.

According to a further form of the present disclosure, a protrusive rotation stopping tab may be formed on an inner side of the bezel and a rotation stopping groove in which the protrusive rotation stopping tab is inserted and locked may be formed on an outer side of the spacer, and a plurality of rotation stopping tabs or rotation stopping grooves may be circumferentially formed, so that the spacer may be rotated step by step on the bezel.

According to a further form of the present disclosure, the vent unit may further include a wing connector formed in a ring shape and disposed inside the spacer to circumferentially rotate relative to the spacer, in which the wing may be coupled to the wing connector through the hinge shaft.

According to a further form of the present disclosure, the bezel may open upwardly and may have an installation space inside, the first through-holes may be formed at a lower end of the bezel, the spacer may be inserted in the installation space, a ring-shaped cover may be coupled to an open upper end of the installation space, third through-holes may be formed at the cover, and when the first through-holes, the second through-holes, and the third through-holes are aligned by circumferential relative rotation of the spacer, conditioning air may be discharged to the interior.

According to a further form of the present disclosure, the first through-holes of the bezel and the third through-holes of the cover may be aligned when the bezel and the cover are combined, and the second through-holes may be circumferentially relatively rotated.

According to a further form of the present disclosure, the vent unit may further include a knob coupled to the lower portion of the spacer and exposed to the outside through the lower end of the bezel, in which a guide hole through which the knob passes and that extends along a circumferential rotational path of the knob may be formed at the lower end of the bezel.

According to the vent unit for a vehicle of the present disclosure, it is possible to control flow of conditioning air that is discharged to the interior from an automotive air-conditioning system and it is also possible to improve pleasantness for passengers by intensively or dispersedly blowing the discharged conditioning air.

In particular, the vent unit for a vehicle of the present disclosure can be manufactured in the same size and shape as existing vent units for a vehicle, so it is possible to install a new vent unit for a vehicle even without changing the internal structures of the existing vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
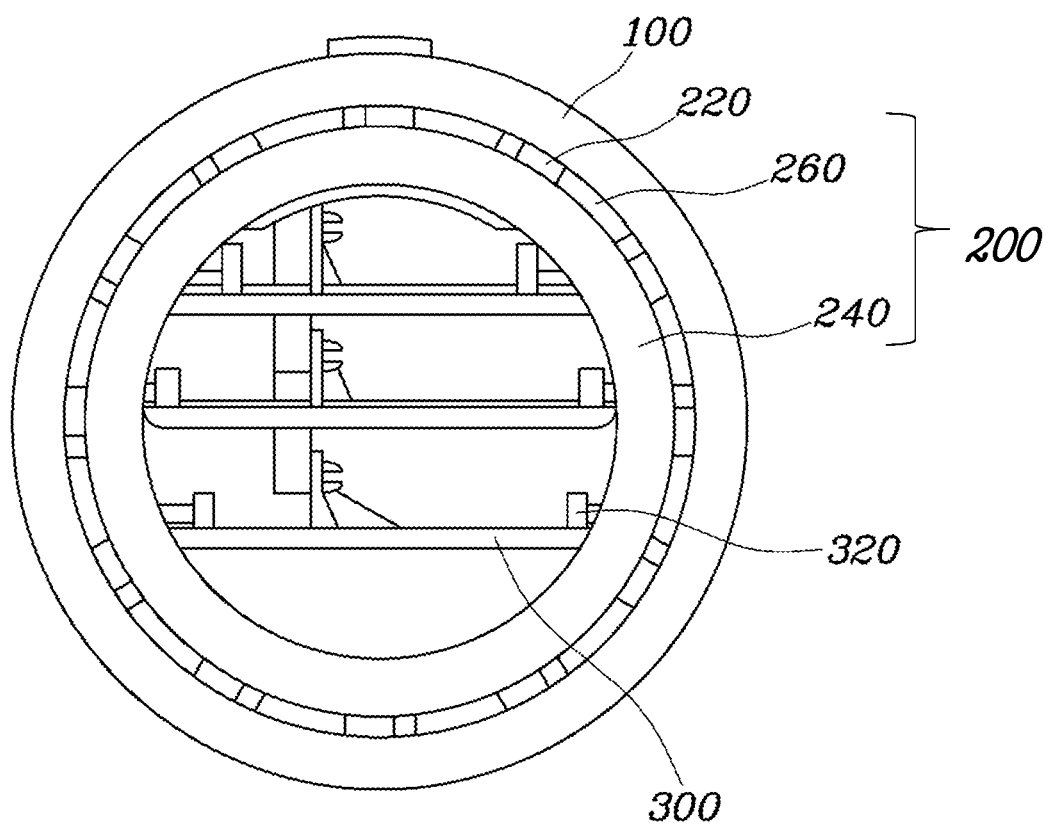
FIG. 1 is a plane view of a vent unit for a vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A vent unit for a vehicle according to an exemplary form of the present disclosure, as shown in FIGS. 1, 2, 3, 4, 6, and 7, includes a bezel 100 installed on a vehicle, formed in a ring shape with a flow hole 140 at the center, and having a plurality of first through-holes 120 circumferentially spaced apart from one another, a spacer 200 overlapping and coupled to the bezel 100, formed in a ring shape rotating relative to the bezel 100, and having a plurality of second through-holes 220 circumferentially spaced apart from one another such that conditioning air is discharged to the interior through the second through-holes 220 and the first through-holes 120 when the second through-holes 220 are aligned with the first through-holes 120 by circumferential rotation relative to the bezel 100, and a wing 300 disposed in the flow hole 140 of the bezel 100, coupled to the spacer 200 through a hinge shaft 320, controlling discharge of conditioning air through the flow hole 140 by axially rotating about the hinge shaft 320, and circumferentially rotating together with the spacer 200 with respect to the bezel 100. The vent unit for the vehicle is connected to an air-conditioning system through a duct, thereby discharging conditioning air to the interior of the vehicle.

Figure 2:
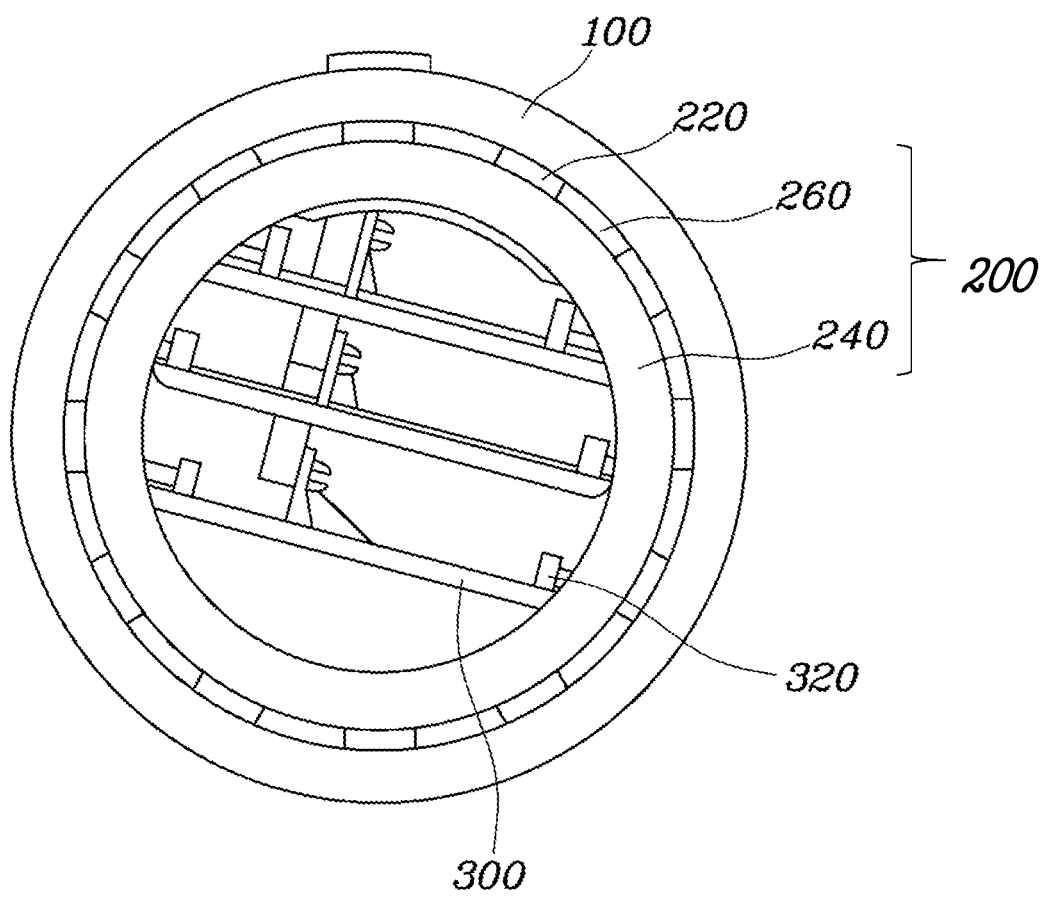
FIG. 2 is a plane view of the vent unit in FIG. 1 with a spacer rotated.

In conventional vent units for a vehicle, conditioning air can be discharged only when a wing is opened by relatively rotating about a hinge shaft, and the discharged conditioning air is intensively blown, so we have discovered that pleasantness for passengers is deteriorated. Accordingly, in order to discharge conditioning air in various ways, the present disclosure has a structure that can intensively and dispersedly blow conditioning air to the interior of a vehicle through the spacer 200 other than the wing 300. That is, as shown in FIG. 1, as for dispersed discharge of the conditioning air, when the spacer 200 is rotated and the first through-holes 120 of the bezel 100 and the second through-holes 220 of the spacer 200 are aligned, the conditioning air can be discharged even through the first through-holes 120 and the second through-holes 220. In addition, when the spacer 200 is rotated and the first through-holes 120 of the bezel 100 and the second through-holes 220 of the spacer 200 are not aligned, as shown in FIG. 2, the conditioning air is not dispersedly discharged through the first through-holes 120 and the second through-holes 220. Since the wing 300 is circumferentially relatively rotated together with the spacer 200, the direction of the conditioning air coming from the wing 300 can be independently controlled, as in the conventional vent unit. Accordingly, it is possible to determine various discharge patterns by opening or closing the wing 300 or the spacer 200 and relatively rotating the wing 300.

Figure 3:
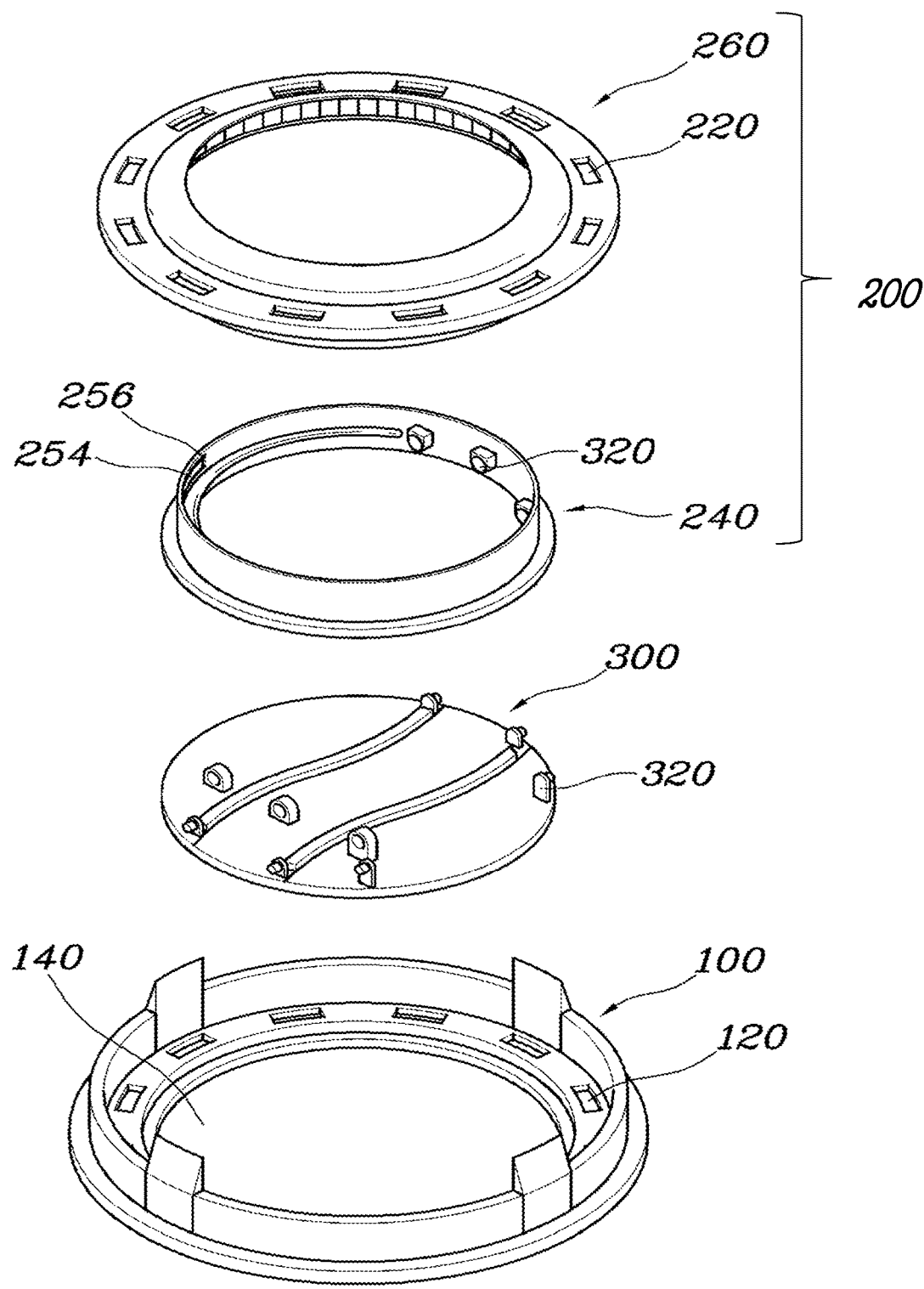
FIG. 3 is an exploded view of the vent unit in FIG. 1.

Meanwhile, as shown in FIGS. 1, 3, 4 and 5, the spacer 200 is composed of an inner spacer 240 and an outer spacer 260 surrounding the inner spacer 240. The wing 300 is coupled to the inner spacer 240 through the hinge shaft 320 and the second through-holes 220 circumferentially spaced apart from one another are formed at the outer spacer 260. A locking structure 250 is formed on each of the sides facing each other of the inner spacer 240 and the outer spacer 260, so when the inner spacer 240 and the wing 300 are rotated in a first direction (a counterclockwise direction), the outer spacer 260 is not rotated, and when the inner spacer 240 and the wing 300 are rotated in a second direction (a clockwise direction), the outer spacer 260 can also be rotated. In an exploded view of the vent unit, as shown in FIG. 3, when the wing 300 is rotated in the first direction, the outer spacer 260 is not rotated, so only the direction of the conditioning air discharged through the wing 300 can be controlled. On the contrary, when the wing 300 is rotated in the second direction, the outer spacer 260 is also rotated, so it is possible to not only control the direction of the conditioning air discharged through the wing 300, but also control discharge of the conditioning air at the bezel 100 by controlling alignment of the first through-holes 120 and the second through-holes 220 based on rotation of the outer spacer 260. As described above, in FIG. 4, by forming the locking structures 250 on the spacer 200, rotation of the wing 300 and opening/closing of the first through-holes 120 of the bezel 100 are simultaneously controlled or only the rotation of the wing 300 is controlled, thereby enabling a passenger to more conveniently control the direction of the conditioning air and open/close the through-holes.

Figure 4:
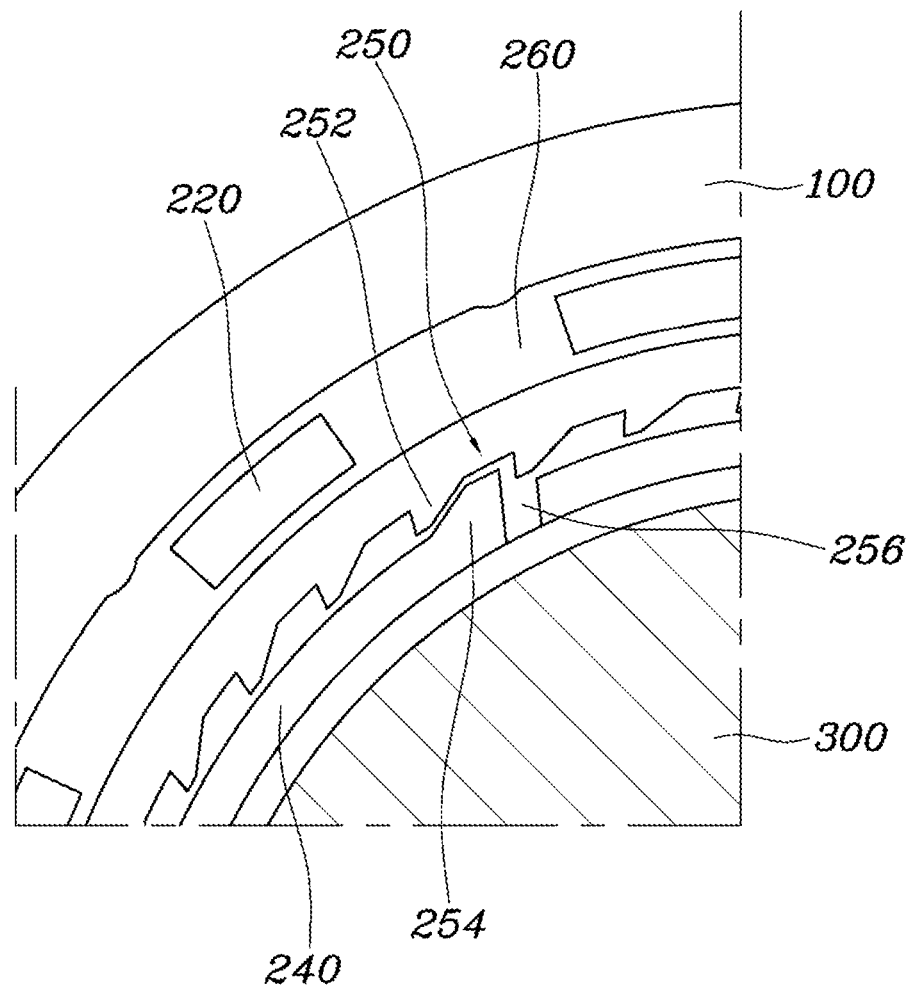
FIG. 4 is a detailed view of a locking structure in the vent unit according to a form of the present disclosure.

According to an exemplary form of the present disclosure, protrusions 252 are formed on one of the outer side of the inner spacer 240 and the inner side of the outer spacer 260, and a rotation control tab 254 that is locked to the protrusions 252 is formed on the other one. As shown in FIG. 4, for example, the protrusions 252 are formed on the inner side of the outer spacer 260, and the rotation control tab 254 is formed on the outer side of the inner spacer 240. When the rotation control tab 254 comes in contact with the protrusions 252 by rotation of the inner spacer 240 and the wing 300 in the first direction, it slides over the protrusions 252 without interference with the protrusions 252, and when the rotation control tab 254 comes in contact with the protrusions 252 by rotation of the inner spacer 240 and the wing 300 in the second direction, it is locked to the protrusions 252, so the inner spacer 240 and the outer spacer 260 can be rotated together. The rotation control tab 254 and the protrusions 252 have slopes faced each other when the inner spacer 240 and the wing 300 are rotated in the first direction, so the rotation control tab 254 can slide over the slopes of the protrusions 252.

In addition, when the inner spacer 240 and the wing 300 are rotated counterclockwise in FIG. 4, the rotation control tab 254 slides over the slopes of the protrusions 252, so the outer spacer 260 is not rotated, whereby the direction of the conditioning air only discharged from the wing 300 can be controlled. On the contrary, when the inner spacer 240 and the wing 300 are rotated clockwise, the right side of the rotation control tab 254 comes in surface contacts with the protrusions 252, so the rotation control tab 254 cannot slide over the protrusions 252, whereby the outer spacer 260 is also rotated together. In this case, the direction of the conditioning air discharged from the wing 300 is controlled and the second through-holes 220 of the outer spacer 260 can be opened or closed.

Figure 5:
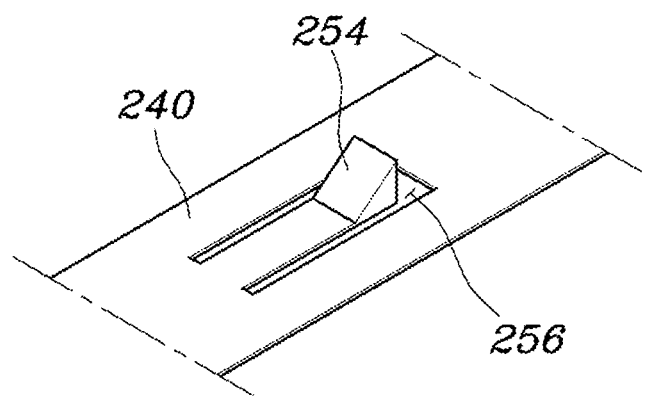
FIG. 5 is a detailed view of the locking structure in an inner spacer in FIG. 4.

As shown in FIGS. 3 through 5, a slit 256 is formed on the edge of rotation control tab 254, so when the rotation control tab 254 slides over the slopes of the protrusions 252, the rotation control tab 254 can move back with elasticity (by a material such as plastic). The rotation control tab 254 has the structure enabling backward movement, the rotation control tab 254 can be induced to smoothly slide over the protrusions 252. Accordingly, it is possible to inhibit the rotation control tab 254 and the protrusions 252 from being damaged or worn and it is also possible to independently control dispersed discharge and intensive discharge.

As shown in FIG. 4, the rotation control tab 254 may be formed on the outer side of the inner spacer 240 and the protrusions 252 may be formed in the shape of gear teeth on the inner side of the outer spacer 260. Since the protrusions 252 are continuously formed in the shape of gear teeth, the rotation control tab 254 sequentially comes in contact with the protrusions 252. Accordingly, when the inner spacer 240 and the wing 300 are rotated clockwise, it is possible to immediately control opening or closing of the second through-holes 220, so continuity of control is secured and convenience for a user is improved.

Figure 11:
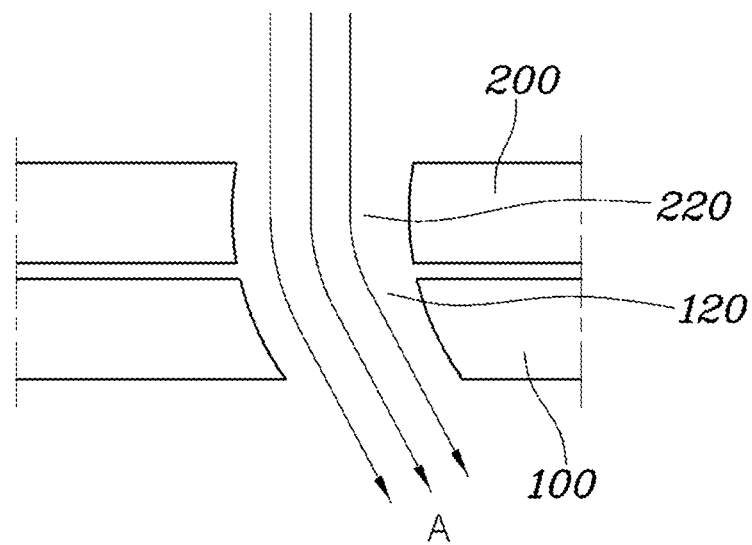
FIG. 11 is a section view of a first through-hole and a second through-hole in the vent unit aligned each other according to a form of the present disclosure.

Furthermore, as shown in FIG. 11, the first through-holes 120 of the bezel 100 are inclined outward in the bezel 100 in the discharge direction of air, so the conditioning air that is discharged through the first through-holes 120 can be distributed. Accordingly, the conditioning air is not vertically discharged and the blow angle of the conditioning air discharged along a path "A" is increased, so the discharge area of the conditioning air is increased. Further, intensive blowing of the conditioning air is inhibited or reduced, so pleasantness for a passenger can be improved.

Figure 6:
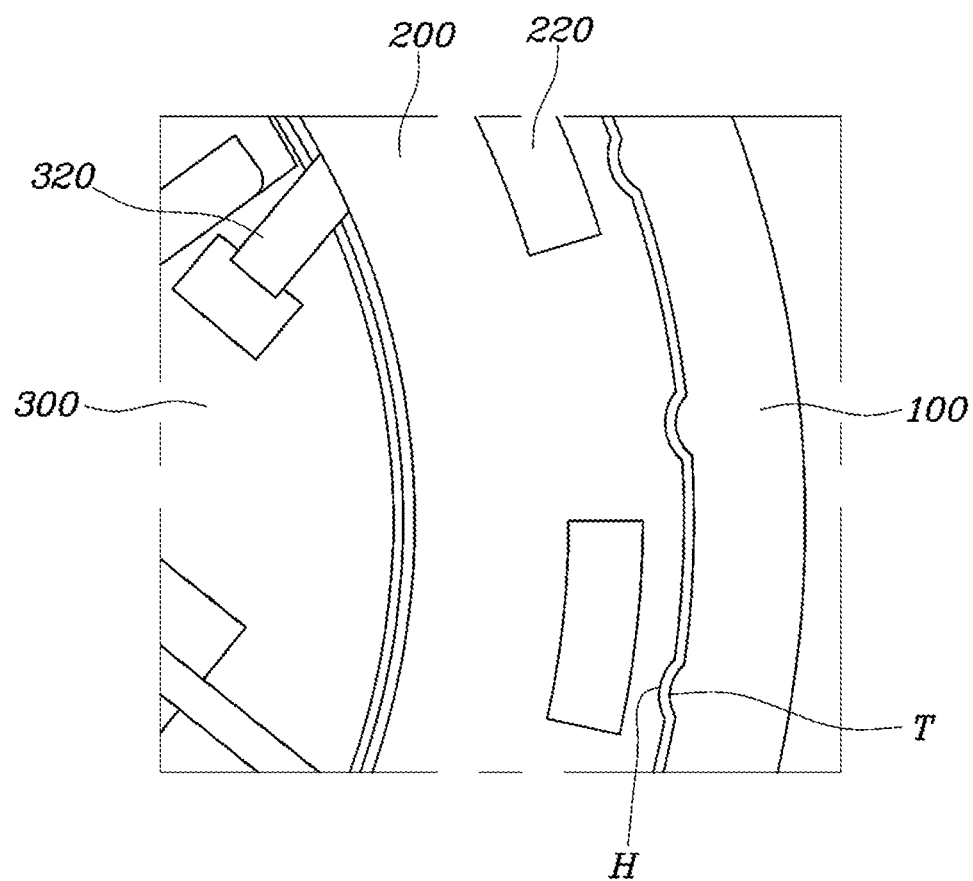
FIG. 6 is a detailed view of a vent unit according to another form of the present disclosure.

Referring to FIG. 6, a protrusive rotation stopping tab T is formed on one of the outer side of the spacer 200 and the inner side of the bezel 100 that face each other and a rotation stopping groove H in which the rotation stopping tab T is inserted and locked is formed on the other one. According to an exemplary form of the present disclosure, the protrusive rotation stopping tab T is formed on the inner side of the bezel 100 and the rotation stopping groove H is formed on the outer side of the spacer 200. A plurality of rotation stopping tabs T or rotation stopping grooves H is circumferentially formed, so the spacer 200 can be rotated step by step on the bezel 100. In this case, when the spacer 200 is rotated, the rotation stopping tabs T and the rotation stopping grooves H are locked each other, so feeling of temporal locking is generated. A passenger can finely rotate the spacer 200 step by step due to the feeling of temporal locking and can precisely control rotation of the spacer 200.

Referring to FIGS. 7 to 10, the present disclosure includes a wing connector 340 formed in a ring shape and disposed inside the spacer 200 to circumferentially rotate relative to the spacer 200, and the wing 300 may be coupled to the wing connector 340 through the hinge shaft 320. According to this structure, the wing 300 and the spacer 200 are independently rotated and a passenger can control only the direction of the wing 300 or can separately control only opening/closing the second through-holes 220 of the spacer 200.

Figure 7:
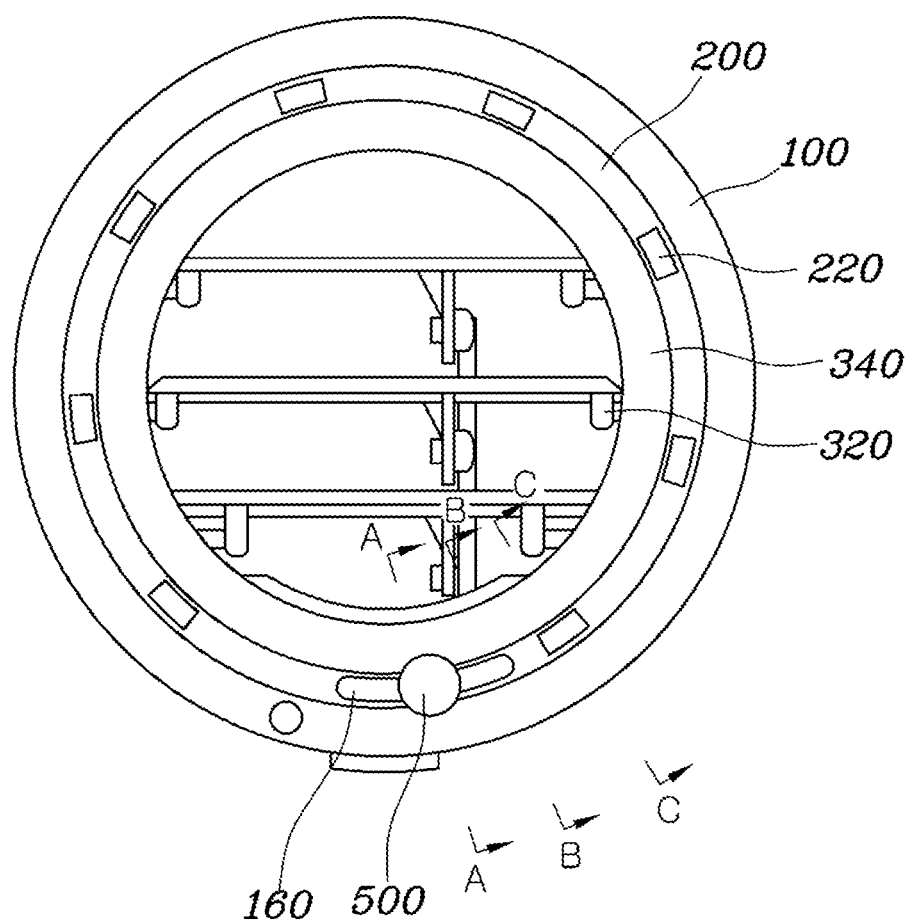
FIG. 7 is a plane view of a vent unit for a vehicle according to another form of the present disclosure.
Figure 8:
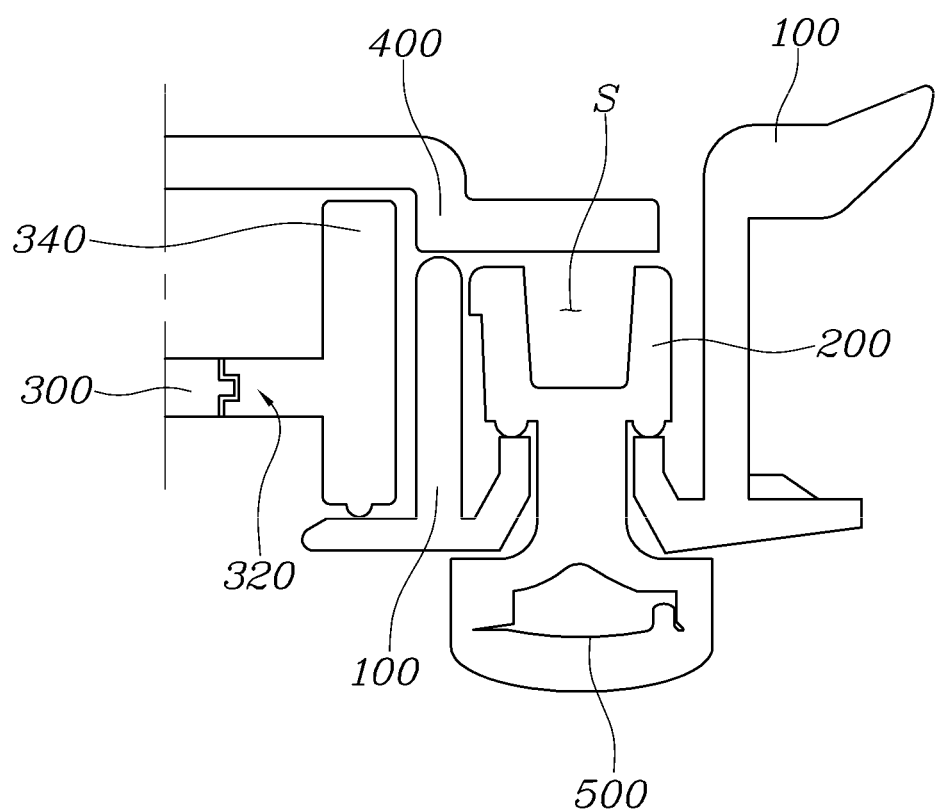
FIG. 8 is a cross-sectional view of the vent unit for a vehicle taken along line A-A in FIG. 7.
Figure 9:
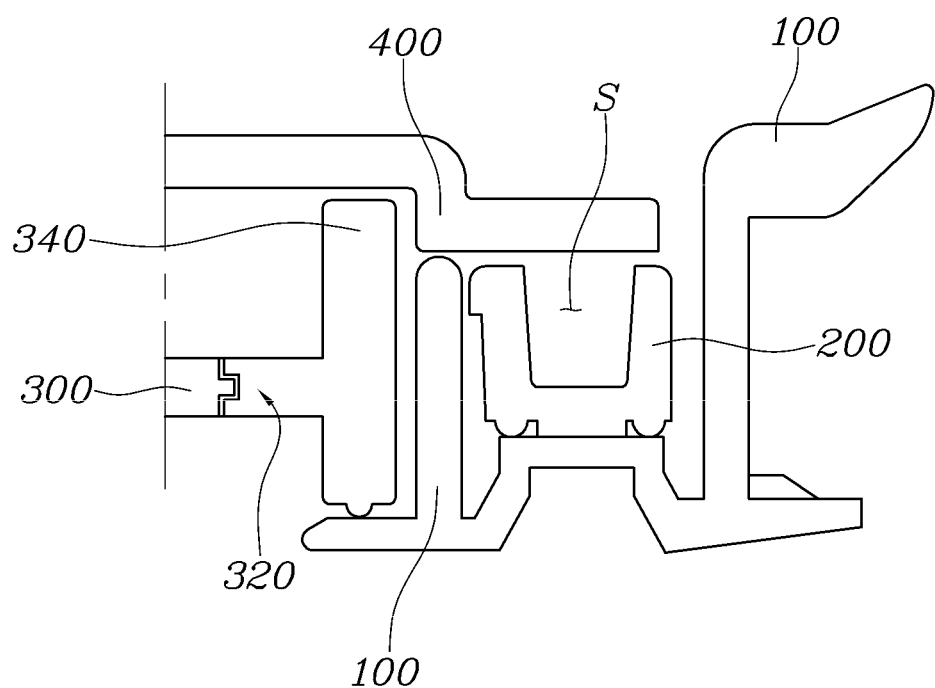
FIG. 9 is a cross-sectional view of the vent unit for a vehicle taken along line B-B in FIG. 7.
Figure 10:
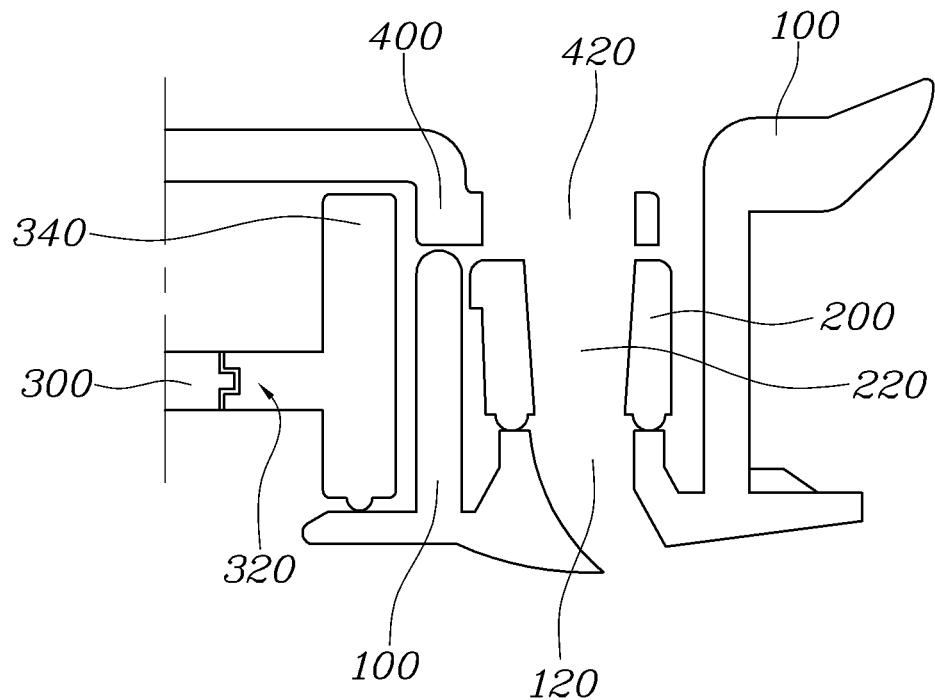
FIG. 10 is a cross-sectional view of the vent unit for a vehicle taken along line C-C in FIG. 7.

As shown in FIGS. 8 to 10, the bezel 100 opens upwardly and has an installation space S inside. The first through-holes 120 of the bezel 100 are formed at the lower end of the installation space S, the spacer 200 is inserted in the installation space S, a ring-shaped cover 400 is coupled to the open upper end of the installation space S, and third through-holes 420 are formed at the cover 400. Accordingly, when the first through-holes 120, the second through-holes 220, and the third through-holes 420 are aligned by circumferential relative rotation of the spacer 200, conditioning air can be discharged to the interior. As shown in FIGS. 8 to 10, the first through-holes 120 of the bezel 100 and the third through-holes 420 of the cover 400 are aligned when the bezel 100 and the cover 400 are combined, and the second through-holes 220 can be circumferentially relatively rotated. The present disclosure further includes a knob 500 coupled to the lower portion of the spacer 200 and exposed to the outside through the lower end of the bezel 100, and a guide hole 160 through which the knob 500 passes and that extends along a circumferential rotational path of the knob 500 may be formed at the lower end of the bezel 100. The knob 500 is configured as a handle of the spacer 200, so it is easy to rotate the spacer 200. Accordingly, as shown in FIG. 7, it is possible to easily control opening/closing of the second through-holes 220 of the spacer 200 using the knob 500 in the guide hole 160. In this case, dispersed discharge is controlled not by the wing, but by the separate knob 500, so the control components for intensive discharge and dispersed discharge are separated. Accordingly, a passenger can intuitionally operate the control components.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A vent unit for a vehicle, the vent unit comprising:
a bezel installed on the vehicle and formed in a ring shape with a flow hole at a center, the bezel having a plurality of first through-holes circumferentially spaced apart from one another;
a spacer overlapping and coupled to the bezel, and formed in a ring shape rotating relative to the bezel, the spacer having a plurality of second through-holes circumferentially spaced apart from one another such that conditioning air is discharged to an interior through the second through-holes and the first through-holes when the second through-holes are aligned with the first through-holes by circumferential rotation relative to the bezel; and
a wing disposed in the flow hole of the bezel and coupled to the spacer through a hinge shaft, the wing configured to control discharge of conditioning air through the flow hole by axially rotating about the hinge shaft and circumferentially relatively rotating together with the spacer with respect to the bezel,
wherein:
the spacer includes: an inner spacer and an outer spacer surrounding the inner spacer, the wing is coupled to the inner spacer through the hinge shaft, the second through-holes circumferentially spaced apart from one another are formed at the outer spacer,
protrusions are formed on an inner side of the outer spacer,
a rotation control tab is formed on an outer side of the inner spacer and configured to slide over the protrusions of the outer spacer without interference with the protrusions when the inner spacer rotates in a first direction,
the rotation control tab of the inner spacer is configured to engage with the protrusions of the outer spacer when the inner spacer rotates in a second direction opposite to the first direction such that the inner spacer and the outer spacer rotate together,
the rotation control tab and the protrusions have slopes that face each other,
the rotation control tab is made of an elastic material, and the rotation control tab and the inner spacer being formed as a single piece of material, and
a slit is formed in the inner spacer, the rotation control tab residing within the slit, the slit being configured to allow the rotation control tab to move toward a center of the inner spacer with elasticity when the rotation control tab slides over the slopes of the protrusions.

2. The vent unit of claim 1, wherein when the inner spacer and the wing are rotated in the first direction, the outer spacer is not rotated, and when the inner spacer and the wing are rotated in the second direction, the outer spacer and the inner spacer are rotated together.

3. The vent unit of claim 1, wherein the protrusions are formed in the shape of gear teeth on the inner side of the outer spacer.

4. The vent unit of claim 1, wherein the first through-holes of the bezel are inclined outward in the bezel in a discharge direction of air, so that conditioning air that is discharged through the first through-holes is distributed.

5. The vent unit of claim 1, wherein a protrusive rotation stopping tab is formed on an inner side of the bezel and a rotation stopping groove in which the protrusive rotation stopping tab is inserted and locked is formed on an outer side of the spacer, and a plurality of rotation stopping tabs or rotation stopping grooves is circumferentially formed, so that the spacer is rotated step by step on the bezel.

6. The vent unit of claim 1, further comprising a wing connector formed in a ring shape and disposed inside the spacer to circumferentially rotate relative to the spacer,
wherein the wing is coupled to the wing connector through the hinge shaft.

7. The vent unit of claim 6, wherein the bezel opens upwardly and has an installation space inside, the first through-holes are formed at a lower end of the bezel, the spacer is inserted in the installation space, a ring-shaped cover is coupled to an open upper end of the installation space, and third through-holes are formed at the cover, and
when the first through-holes, the second through-holes, and the third through-holes are aligned by circumferential relative rotation of the spacer, conditioning air is discharged to the interior.

8. The vent unit of claim 7, wherein the first through-holes of the bezel and the third through-holes of the cover are aligned when the bezel and the cover are combined, and the second through-holes are circumferentially relatively rotated.

9. The vent unit of claim 8, further comprising a knob coupled to a lower portion of the spacer and exposed to an outside through the lower end of the bezel,
wherein a guide hole through which the knob passes and that extends along a circumferential rotational path of the knob is formed at the lower end of the bezel.

* * * * *